United States Patent
Chang et al.

(10) Patent No.: US 7,277,416 B1
(45) Date of Patent: Oct. 2, 2007

(54) NETWORK BASED IP ADDRESS ASSIGNMENT FOR STATIC IP SUBSCRIBER

(75) Inventors: Patricia Ruey Chang, San Ramon, CA (US); Clarence E. Drumheller, Belleville, NJ (US); Ce Xu, San Ramon, CA (US); William C. King, Lafayette, CA (US); Jack Tang, Danville, CA (US); Peter Hu, Pleasanton, CA (US); Peter Li, Albany, CA (US)

(73) Assignee: Cellco Partnership, Bedminster, NJ (US)

( * ) Notice: Subject to any disclaimer, the term of this patent is extended or adjusted under 35 U.S.C. 154(b) by 742 days.

(21) Appl. No.: 10/652,559

(22) Filed: Sep. 2, 2003

(51) Int. Cl.
*H04Q 7/00* (2006.01)
*H04J 15/00* (2006.01)
*H04M 1/00* (2006.01)
*H04M 3/00* (2006.01)

(52) U.S. Cl. .............. 370/338; 370/328; 370/912; 455/419; 455/550.1; 455/556.2

(58) Field of Classification Search .. 455/432.1–432.3, 455/439, 551, 550.1, 552.1, 560–561, 556.2, 455/517, 403, 440, 410–411, 422.1, 434, 455/437, 418–419, 425, 461, 435.1, 466; 709/203, 228–229; 380/247–249; 713/155, 713/161–162, 168–171; 370/395.52–395.53, 370/395.1, 395.5, 912–913, 310, 902, 312–313, 370/328–338, 378–379, 381–386, 389–393, 370/349, 908; 379/201.05, 218.01; 717/173, 717/178
See application file for complete search history.

(56) References Cited

U.S. PATENT DOCUMENTS

| | | | |
|---|---|---|---|
| 6,104,929 A * | 8/2000 | Josse et al. ................. | 455/445 |
| 6,404,754 B1 | 6/2002 | Lim | |
| 6,469,998 B1 * | 10/2002 | Burgaleta Salinas et al. ......................... | 370/338 |
| 6,522,876 B1 | 2/2003 | Weiland et al. | |
| 6,894,994 B1 * | 5/2005 | Grob et al. ................. | 370/469 |
| 2002/0049850 A1 * | 4/2002 | Fiori et al. ................. | 709/227 |
| 2003/0002480 A1 * | 1/2003 | Giustina et al. ............ | 370/352 |
| 2003/0023737 A1 * | 1/2003 | Johnson et al. ............ | 709/230 |
| 2004/0013116 A1 * | 1/2004 | Greis et al. ................. | 370/392 |
| 2004/0153525 A1 * | 8/2004 | Borella ....................... | 709/217 |

* cited by examiner

*Primary Examiner*—Meless Zewdu
(74) *Attorney, Agent, or Firm*—McDermott Will & Emery LLP

(57) ABSTRACT

In existing standards for packet data communication over enhanced cellular networks, for a subscriber having a static address, the network relies on the terminal to provide the static address. Consequently, the terminal needs to know (be programmed with) its own static address and typically the address of a home agent element of the network. To eliminate the attendant need to provision such address data in the mobile station, the static address is stored in a node of the network, and the network assigns that one address to the mobile station, every time when the subscriber requests packet data service, for example, using a mobile IP (MIP) type address assignment procedure. The address assignment operation may also provide the home agent address to the station.

20 Claims, 6 Drawing Sheets

NETWORK BASED IP ADDRESS ASSIGNMENT FOR STATIC IP SUBSCRIBER

TECHNICAL FIELD

The present subject matter relates to techniques, software and network equipment to enhance implementation of packet data communications services to subscribers in a mobile communication network, whose devices utilize static packet network addresses.

BACKGROUND

In recent years, cellular or personal communication service type mobile telephones have emerged as a must-have appliance among mobile professionals and consumers alike, growing in popularity every year since they were first introduced. The public has come to accept that mobile service enhances business and personal communications and may contribute to personal security. Consequently, mobile communication is becoming increasingly popular, particularly for voice-grade telephone services, and more recently for data communication services.

The cellular wireless networks originally were designed to service circuit-switched voice communications. More recently, many mobile service providers have been upgrading the wireless networks to support packet-switched data communications services, which are intended to extend the common data communication capabilities of the wired domain to the wireless mobile domain. For such services, a node of the radio access network (RAN) provides an interface between the transmission of the packet data over the air interface of the radio network and the transmission of the packet data in the fixed network.

A packet-switched network routes each packet individually through the network, though not necessarily through a common path; as opposed to the traditional circuit switched approach to telephone service and the like that provides a path through the network for the duration of the communication session. Packet switching uses a standard packet protocol, such as the Internet Protocol (IP). The routing decision regarding each packet's next hop through the packet switched network is made on a hop-by-hop basis (typically between neighboring switching nodes). A circuit switched link provides constant sequential throughput with minimal delay caused by the network. In contrast, because they take different paths, different packets take different times to transit the network and may even arrive out of sequence.

The wireless data services, for example, support a range of communication applications utilizing two-way packet-switched packetized data, such as browsing, instant messaging, e-mail and the like. Wireless network operations for data calls are tailored to support traditional IP packet-based service applications. To conduct packet data communications through such a network, as in any other IP-based packet data network, each operating mobile station must have its own IP address. The station uses the IP address as a source identifier, when sending packets, and other data terminals on the wide area packet data network(s) use the IP address as a destination address when sending packets to the mobile station. The various points in the network that must decide how to route the packets rely in major part on analysis of the addresses in the packet headers to make such decisions.

In many cases, the addresses are assigned to terminals on a temporary basis, e.g. for the duration of a session. However, some data terminals have permanently assigned or "static" IP addresses that they keep all of the time. In the mobile network, some mobile stations similarly have statically assigned IP addresses. For static IP subscribers, the prior practice has been to rely on the terminal to provide the static IP address, which requires the service provider to program the static IP address into the respective mobile station. Mobile packet data operations also require that the station know the IP address of its assigned home agent, which is a node of the network that receives packets addressed to the mobile station and forwards them to the station's current roaming location in the network. For static IP subscribers, this has required additional pre-provisioning of the mobile station with the home agent IP address (HA IP). One disadvantage of that current solution is that the service providers need to pre-provision the static IP address and HA IP address into the terminal. Such provisioning tasks create noticeable amounts of work for the carrier's technical support personnel.

Also, if a service provider needs to move a static IP subscriber into a region served by a different home agent (HA) node, which itself has a different HA IP address, then the static IP subscriber will need to bring the mobile station into the provider's store or service center, to allow technical personnel to modify the Home Agent IP address programmed in the mobile station. The need for the customer to take the mobile station to the provider's location has been a major disturbance for the effected subscribers Similarly, if the static IP subscriber decides to either change from the static IP service to dynamic IP service, or to change the static Home IP address, the subscriber again must bring the mobile station into the provider's store or service center, to allow technical personnel to modify the Home IP address to 0.0.0.0. or to the new value for the static Home IP address. This need for the customer to take the mobile station to the provider's location again is a major disturbance for the effected subscribers. In addition, when there is a change, the service provider has no way to stop the subscriber from continuing to use the static IP service, unless and until the subscriber takes the mobile station to store or service center for re-programming, which potentially reduces service provider's revenue.

Also, a potential fraud issue relates to MIP static IP subscribers. The IS-835 standard does not provide any mechanism to prevent a valid subscriber from using another subscriber's static IP. This allows a fraudulent person to hijack another subscriber's information. For example, a fraudulent person, who is a valid static IP subscriber, can send his valid NAI, MN-AAA, MN-HA, FA-Challenge, but program his mobile station to send another subscriber's static IP address via the mobile request message (RRQ). All information except the static IP address will be sent to AAA server for validation. The AAA server will grant the request, as the fraudulent person is a valid static IP subscriber. However, actual communications are conducted using the victim's fraudulently obtained static IP address. From now on until his mobile station disconnects, the fraudulent person is allowed to receive the other person's "pushed" services. Some of those may be confidential.

It is believed that this fraud issue may even extend to permit abuse by hacker's subscribing to dynamic assignment service, for example mobile IP (MIP) service. With current standard based solution, any subscriber, regardless dynamic or static, is able to request any static IP address from the network by providing non-default values in the mobile request message (RRQ). Since there is no validation of the addresses from that message with respect to the particular mobile station or subscriber, the network is likely to grant the static IP address, even for the dynamic IP subscriber/hacker. For example, assume that the hacker subscribes to dynamic IP service and the victim subscribes to static IP service, from the same provider. If the hacker knows the victim's static IP address, the hacker can modify her handset so as to provision the victim's static IP address and Home Agent IP address into her phone. Then, when the hacker initiates a data call from the modified mobile station, the station requests a MIP service to the provider's wireless network but provides the static IP address and home agent IP address of the victim's static service. Most likely, the provider's network will grant the hacker's service request, assign the victim's static IP address to the hacker's mobile station for that specific session and duration. During that fraudulent session, the hacker is able to get all the proprietary and confidential "pushed information" from different servers that otherwise would be intended for delivery to the victim's mobile station. For example, this may allow the hacker to obtain information from the victim's bank, clients, etc.

Hence a need exists for a technique to automatically provide static address information in a mobile communication device, that does not entail pre-programming of that information into the device, particularly without the need for programming by a carrier or service provider's technical personnel. An attendant need exists for enhancing security and reducing the potential for fraudulent misuse of static IP addresses in the wireless network.

SUMMARY

The concepts disclosed herein alleviate the above noted problems with administration of address information for static address type subscribers in a mobile data communication network. A subscriber's static packet network address is stored in a node of the wireless communication network, and the network assigns and downloads the subscriber's own static address to the mobile station, every time the station initiates packet data communication, e.g. every time the subscriber logs in for packet data service.

The address assignment, for example, may use an otherwise normal mobile IP (MIP) type address assignment procedure. The network can also inform the mobile station of the appropriate home agent address, as part of the procedure to download the static address. The assignment of the static address to the mobile station places control of the assignment in the network, hence, the network can effectively validate the assignment of a particular static address to the mobile station.

One advantage of these concepts is that the home IP address and Home Agent IP address are not required to be pre-provisioned in the mobile station type terminal device. This reduces the provisioning time/cost as well as the errors that often occur during provisioning by technical personnel. The new approach outlined above also allows service providers to change association of the static IP address from one home agent to a different home agent, without impacting subscribers, i.e., the subscriber does not need to come to the store or service center to change HA IP address stored in the mobile station because the new address is automatically downloaded during each registration for IP communication. Everything is transparent to the static IP subscribers.

The ability to validate the assignment of static IP addresses to particular mobile stations also enhances security. In particular, this approach eliminates assignment of other peoples addresses to fraudulent users/hackers. The network will validate the hacker's mobile station, but it will recognize that it is not allowed to use a specified static IP address of a different station or subscriber, for example, even if the station included the victim's address in the request message. The network may reject the fraudulent service request entirely or only grant a dynamically assigned IP address back to hacker's mobile station, but in either case, the hacker is not able to use a fraudulently obtained static IP address of another party.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations.

DETAILED DESCRIPTION

As outlined above, the subject matter here relates to techniques, software and equipment to enhance implementation of packet data communications services to subscribers in a mobile communication network, whose device utilize static packet network addresses, by downloading the static addresses as part of the establishment of the packet communication sessions. An overview of the preferred approach is provided first, followed by a detailed discussion of an exemplary network, discussion of a specific call flow for implementation in that network, and a discussion of a call flow implementation in an alternative network infrastructure.

1. Overview

As discussed herein, static packet network addresses are stored in a node of the wireless communication network, and the network assigns and downloads a subscriber's own static address to the mobile station, every time the station initiates packet data communication, e.g. every time the subscriber logs in for packet data service. The address assignment, for example, may use an otherwise normal mobile IP (MIP) type address assignment procedure. The network can also inform the mobile station of the appropriate home agent address, as part of the procedure to download the static address. The mobile station need not be specially provisioned, either with the static address or with the home agent address. Also, the service provider can readily change the attachment of the static station address to a particular home agent (one among several) in the provider's network. The address processing may apply to any type of packet network address. However, since the most common form of packet address is that defined by the Internet Protocol (IP), the discussion here will focus on processing as it relates to the exemplary IP addresses.

Figure 1:
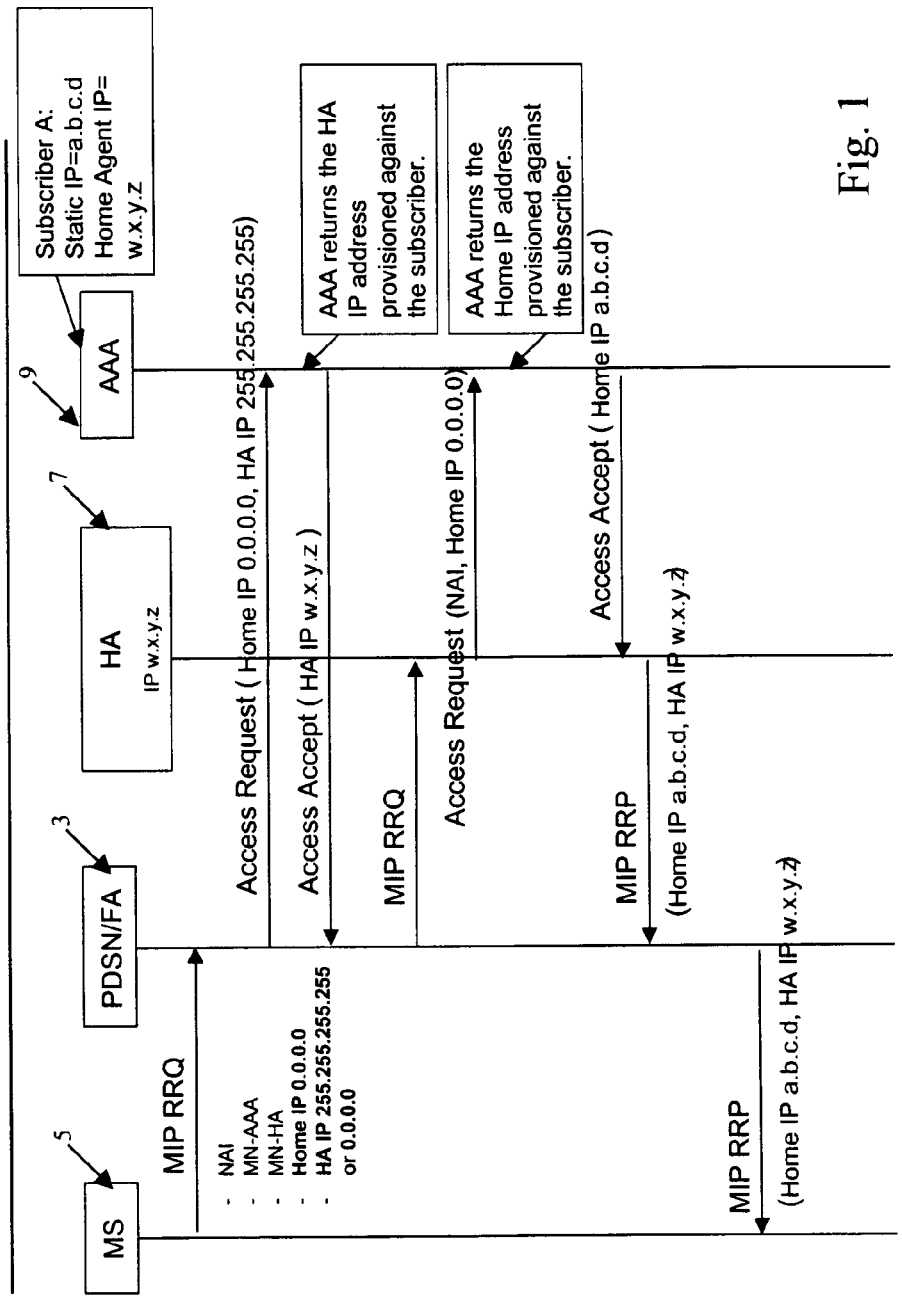
FIG. 1 is a signal flow diagram useful in explaining a mobile IP type call flow for providing a static address to a subscriber's mobile station.

FIG. 1 is a signal flow diagram useful in explaining the processes involved in packet data communication, and particularly the IP address assignment and downloading, for data communications through a wireless network. The drawing shows the signals exchanged between a mobile station (MS) 5, a packet data serving node (PDSN) 3 that functions as a foreign agent FA for packet routing service, a control computer 7 in the network serving as a home agent (HA) for packet routing service, and an Authentication, Authorization and Accounting (AAA) server 9.

As will become apparent in later discussions of specific network implementations, communications to and from the mobile station 5 go over the wireless "air-link," though the other elements 3, 7 and 9 communicate over typically wired portions of the network. Of course, various network architectures may use somewhat different elements (or at least different names for such elements) to perform the functions described below with respect to the PDSN 3, the home agent 7 and the AAA server 9.

The inventive address distribution technique may use a variety of different signaling protocols. In the examples, the protocols used are those commonly used to implement mobile IP (MIP) type dynamic address assignment. The processing of one or more network nodes, however, is modified to operate as discussed herein so that the downloaded IP address for the static service subscribers is always that subscriber's static IP address and preferably so that the MIP processing provides an associated download of the home agent IP address serving the static IP address.

In the illustrated call flow, the processing begins when the mobile station 5 initially requests packet data service, for example by sending a mobile IP request message (MIP RRQ) to the PDSN/FA 3 in the area in which the station 5 is currently operating. The MIP RRQ message includes various station related information, such as the Network Address Identification (NAI), the mobile node to AAA authentication key (MN-AAA), and the mobile node to home agent authentication key (MN-HA).

The MIP RRQ message includes fields for the station's home IP address and the IP address of the subscriber's assigned home agent (HA). The mobile station populates these message fields with data provisioned in its memory. If requesting a static address service under existing standards, the static IP address and home agent IP address would be provisioned in memory and used to populate these message fields. If the station were requesting a dynamic address assignment type data service, however, the memory locations would not have been provisioned and would contain standard default values, typically placed in the station memory during manufacture. The default value for the station IP address is all zeros (0.0.0.0). The default value for the home agent IP address may be zeros (0.0.0.0) or a series of four values of 255 (255.255.255.255).

In the static IP address call flow under consideration here, the mobile station has not been pre-provisioned. Hence the mobile station 5 stores the default values, in our example, home IP=0.0.0.0, and HA IP=255.255.255.255. When it forms and transmits the MIP RRQ request message, the message therefore contains those default values.

The mobile station 5 transmits the MIP RRQ request message over the air link to a base station, which relays the digital data form of that message over hard wired network resources to the PDSN/FA 3. When the PDSN/FA 3 receives the MIP RRQ message, it initiates an Access Request to the AAA server 9. The Access Request sent to the AAA server 9 includes the Home IP address and the HA IP address from the MIP RRQ message, in this case, the Home IP address 0.0.0.0 and the HA IP address 255.255.255.255. The AAA server 9 checks it database to authenticate and validate the subscriber and the station 5 based on the data in the Access request message. The AAA server 9 may trigger a user authentication process, as part of its operations, but discussion here will focus on the address processing.

Unlike prior practice, the AAA server 9 at this point in the exemplary process checks the subscriber profile in its database to determine if the user is a subscriber to static IP address service. If so, the AAA server 9 retrieves the static address (e.g. IP address of a.b.c.d) and in the example retrieves the Home Agent (HA) IP address (e.g. HA IP address=w.x.y.z) from the subscriber profile record associated with this mobile station 5. In a normal MIP IP service scenario, e.g. for a non-static IP subscriber, the AAA server would assign one of the home agents to serve this customer's data session and provide an HA IP address for that select one of the available home agents. However, in the static IP operation, the HA IP address is that from the subscriber own profile record. The HA IP address from the profile may itself be relatively static, although the carrier or other service provider may change that assignment from time to time by populating the subscriber's profile with the IP address of a different home agent.

Hence, for the static IP service, the AAA server 9 returns the HA IP address provisioned in the database against the mobile station subscriber (HA IP address=w.x.y.z) back to the PDSN/FA 3. Using the HA IP address received from the AAA server 9, the PDSN/FA 3 next forwards the MIP RRQ request message to the appropriate HA node 7, that is to say, to the home agent node identified by the received address (HA IP address=w.x.y.z). In response, the addressed home agent 7, that is to say the HA router that controls the packet data service for this static IP subscriber, sends an Access Request message to the AAA server 9. This Access Request message includes the NAI and home IP address of the mobile station, obtained via the MIP RRQ messages. In this case, the home IP address value is still the default value (home IP=0.0.0.0).

In response to the Access Request message from the home agent 7, the AAA server 9 returns the home IP address it has assigned to the current session for the requesting subscriber's mobile station, in this case, the static IP address provisioned against the subscriber. The AAA server 9 therefore sends the static IP address (a.b.c.d) in an Access Accept message to the home agent 7. The home agent 7 in turn formulates a MIP response (MIP RRP) message containing the home IP and home agent IP address information (e.g. home IP address=a.b.c.d and HA IP address=w.x.y.z). The home agent 7 sends the MIP RRP with the address information to the PDSN/FA currently serving the station 5, which in turn forwards the message containing the address information to the mobile station 5. Although not shown as a separate step, the mobile station 5 can then send and receive IP packet data using the downloaded static IP address (e.g. IP address=a.b.c.d) and the new IP address of its home agent (e.g. HA IP address=w.x.y.z), in the normal manner used in a wireless packet data communication network.

The discussion above assumed that the mobile station 5 was that of a static IP service customer and that the customer was effectively requesting use of his or her own static IP address. It should be noted, however, that the above processing provides additional validation of address assignments and thus prevents fraudulent misuse of a subscriber's static IP address. In this regard, it may be helpful to consider an example involving a fraudulent request for service.

For purposes of discussion of an attempted fraud, now assume that the mobile station 5 sends another party's static IP address and home agent IP address (e.g. home IP=m.n.o.p; and home agent IP=q.r.s.v) in the initial request message. The call flow will proceed as outlined above, but with the message containing the IP address and home agent IP address provided by the mobile station, until the Access Request message reaches the AAA server 9.

When an Access Request message comes from the home agent 7, the subscriber has passed first phase of subscription validation between the foreign agent 3 and the AAA server 9. The AAA will pass the unique IP address along with MN-AAA key to home agent 7 for second phase of validation. When the home agent 7 gets the information from the AAA server, it will first validate the subscriber by using the MN-AAA key. If the request were to pass validation at this point (a valid static IP address provided by the mobile station), the home agent would normally assign the unique IP address to the subscriber by sending the unique IP address back to the station 5 via the RRP message, which reinforces the subscriber mobile station is to use its own IP address. However, if as in the example, the hacker requests another person's static IP address, then the requested IP address does not match the station in the validation step. Hence, the validation step will fail and the use of that address will not be granted.

Only the unique IP address associated with the valid subscriber (NAI) of the mobile station will be sent back to the mobile station 5. This solution requires an additional VSA attribute in the Access-Accept message sent from the AAA server 9 to the home agent 7. The VSA attribute will include the unique IP address associated with the specific NAI of the mobile station.

In this manner, the network will validate the hacker's mobile station, but it will recognize that it is not allowed to use a specified static IP address, for example, even if the station included that address in the request message. The network may reject the fraudulent service request entirely or only grant a dynamically assigned IP address back to hacker's mobile station, but in either case, the hacker is not able to use a fraudulently obtained static IP address of another party.

The examples discussed herein, including those outlined above, focus on downloading IP type addresses. Those skilled in the art will recognize that different packet data networks may utilize different types of packet addresses, and the static address downloading concepts are applicable to processing of other types of static addresses.

The present concepts may be implemented in a variety of wireless network technologies, particularly those that support Mobile IP type address services, for example, CDMA 1xRTT, CDMA 1xEVDO, GSM, UMTS, GSGN, GGSN, etc. The concepts outlined above are fairly simple—storing the static IP address and Home IP address of static IP subscribers in the network. Then, when a static IP subscriber station requests static IP service, the network always assigns the same static IP address to the subscriber's station, typically using the Mobile IP type processing. At the same time, the network can provide a new or updated home agent assignment, in the form of a new or updated home agent address (e.g. HA IP address).

As noted, the present concepts may be implemented in various wireless IP data communications network infrastructures. To insure full understanding, the next section provides a description of an exemplary 1xRTT type network and certain hardware and software components that may operate therein. The succeeding section then provides a description of how the IP address distribution might be implemented in such a network, and the final section describes how the IP address distribution might be implemented in an alternative network infrastructure such as a 1xEVDO type network.

2. Description of an Exemplary Network Infrastructure

Data services are being provided to mobile customers via a variety of new network architectures. The IS-95A standard types of digital wireless communications originally were developed for cellular voice telephone services and ancillary messaging, although they have been used to provide some data communications. One logical evolution of the IS-95A types of networks, toward a third generation (3G) implementation, involves an upgrade of the digital technology toward CDMA2000-1x or 1x. The attendant 1x Radio Transmission Technology (1xRTT) may use a 1.25 MHz CDMA bandwidth to form a 1xRTT CDMA network implementation. Although there are many benefits associated with such 1x systems, the two most significant benefits are voice capacity increase and high-speed packet data. Studies and simulations have shown that voice capacity increase is between 1.5 to 2 fold over IS-95A and that data can burst at a raw speed of 153.6 Kb/s with a throughput of 144 Kb/s in the initial release.

A 1xRTT CDMA network implementation provides the ability for mobile professionals with their laptop PCs, Pocket PCs, personal digital assistant's (PDAs), and other wireless devices to access the Internet, their email, or corporate intranets in a wireless environment at higher data rates with broader coverage for a richer experience. It enables faster access, richer browser experience with graphics and images, and increased speed and mobility for laptops and PDAs. 1x can support vertical applications, such as telemetry, transactions processing, and database access. Hence, it is envisioned that the present techniques will be utilized in a CDMA 1xRTT network such as that specified in "Wireless IP Network Standard, TIA/EIA/IS-835," among the various wireless infrastructures offering mobile packet data services.

Figure 2:
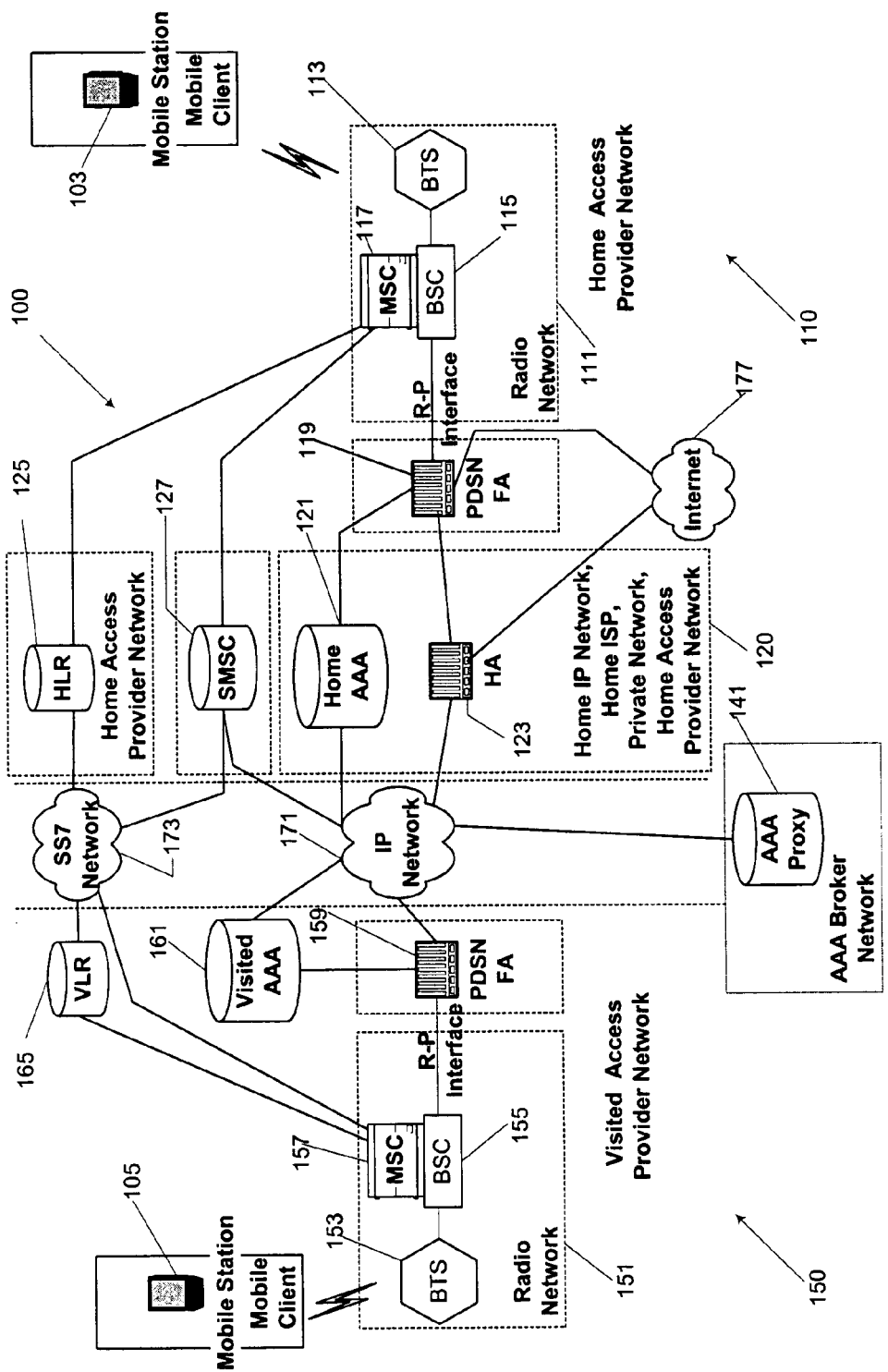
FIG. 2 is a functional block diagram of a mobile or wireless communication of an exemplary network, providing voice and packet data services, in which the call processing of FIG. 1 may be implemented.

Reference now is made in detail to the examples illustrated in the accompanying drawings (FIGS. 2-5) and discussed below. FIG. 2 is a block diagram of a representative 1xRTT CDMA network 100, within which the present invention can be implemented. Network 100 may comprise access networks operated by a large number of separate and independent service providers. For discussion purposes, the drawing shows two such access networks 110 and 150. Through the providers' access networks, the overall network 100 offers mobile communications to customers using mobile stations throughout a wide geographic area. Different customers subscribe to service through different providers and are assigned to specific radio networks (RNs) 111 or 151 as their home networks within access networks 110 or 150; the mobile stations and network elements are provisioned accordingly. Although the illustrated network 100 will provide services for many customers through their mobile stations, for discussion purposes, the drawing shows only two such mobile stations, i.e., MS 103 and MS 105, and those two mobile stations are assumed to belong to customers of the access provider network 110. As shown, MS 103 is operating within the service area of its home access provider network 110. By contrast, the customer using the MS 105 has roamed out of the service area of its home access provider network 110 and into a different geographic area where MS 105 is receiving wireless service from a different access provider network 150, referred to as the "visited" access provider network.

As previously mentioned, MS 103 and MS 105 may take one or more of several forms. For example, a MS may be an enhanced mobile telephone station with a display and user input capabilities to support certain text and image communications, for example, for e-mail and web surfing applications. Another mobile station may comprise a PDA with built-in wireless communication capabilities, such as shown with MS 103 and MS 105 in FIG. 2. As another alternative, a mobile station may comprise a wireless device such as a mobile telephone having data communication capabilities that may be connected to a portable computing device such as a laptop computer. Other mobile station implementations may support packet data communications through the network but not telephone type communications.

In FIG. 2, the elements of RN 111 of the home access provider's network 110, include MS 103 and MS 105, the base stations represented for example by the one base transceiver system (BTS) 113, and the base station controller (BSC) 115. A typical access provider network 110 includes a number of such RNs, although only one is shown for discussion purposes. Each RN serves as the "home" network for some mobile stations (e.g., MS 103) and provides roaming service for mobile stations (not shown) of customers that visit the geographic area served by the RN.

Each mobile station constitutes an interface between the mobile subscriber (or user) and the base station. Besides voice communications, the mobile station provides control and signaling functions. The mobile station is able to tune, under system command, to a logical channel in the frequency spectrum allocated to the system. Each logical channel comprises a pair of channels for two-way conversation. Power levels of the transmitter can also be controlled by the system.

BTS 113 is the part of RN 111 that sends and receives RF signals to/from the mobile stations (e.g., MS 103) it currently serves. BTS 113 contains the antenna systems, towers, transmitters, and receivers at a site. BTS 113 is responsible for the control, monitoring, and supervision of calls made to and from each mobile station within its serving area. BTS 113 assigns and reassigns channels to the mobile stations and monitors the signal levels to recommend hand-offs to other BTSs (not shown).

BSC 115 is a centralized processor that controls the functions of a number of the BTSs (e.g., BTS 113) and helps to manage how calls made by each mobile station are transferred (or "handed-off") from one serving BTS to another. Each wireless network equipment vender implements this function differently. Some vendors have a physical entity, which they call a BSC, while other vendors include this functionality as part of their mobile switching center (MSC). For convenience of illustration, BSC 115 is shown associated with or incorporated into MSC 117.

The network 110 also includes a packet data serving node (PDSN) 119, which is a fixed network routing element introduced in the architecture for 3G networks to support packet data services. The interface between one or more of the CDMA2000-1x radio networks and a PDSN is called a R-P Interface. In the preferred embodiment, PDSN 119 supports Mobile IP addressing for dynamic and static address services and may offer Simple IP service as well. PDSN 119 establishes, maintains and terminates logical links to the associated radio network, in this case RN 111, across the R-P interface. PDSN 119 also supports PPP sessions with mobile stations, such as MS 103.

PDSN 119 initiates Authentication, Authorization and Accounting (AAA) communications for the mobile station client to a home AAA server 121. Home AAA server 121 is also referred to as a remote authentication dial-in user service (RADIUS) server. PDSN 119 receives service parameters for MS 103, as a mobile client, from the AAA server 121. PDSN 119 also collects usage data for accounting purposes, which it relays to AAA server 121. PDSN 119 also is the network element that routes packets to/from external packet data networks, for example through a network service provider 123 to and from the Internet. Network service provider 123 may be an Internet Service Provider (ISP), in this case for the home service of MS 103. Alternatively, the network shown at 123 may coincide with or connect to a private data network or "Intranet" to which the particular customer has secure access. Although shown as a separate link for convenience, the PDSN 119 typically communicates with the AAA server 121 and with the ISP network 123 via a private IP network, such as the network 171.

It may help to take a moment to consider certain fundamentals of packet data communication and the private and public networks that carry such communications. Such a discussion will lead into a discussion of packet services and the address functionality of the wireless network, to help understand the technique for distributing IP addresses in support of a static IP service for a mobile subscriber.

Generally speaking the Internet consists of interconnected networks operated by different entities. Each such separate network is for some purpose an independent or "autonomous" system. An autonomous system is a collection of routers under a single administrative authority, such as a single Internet Service Provider (ISP). Typically, the routers within an autonomous system (AS) use a common interior gateway protocol. The public Internet contains a substantial number of autonomous systems. A router is a node, between two or more segments or network domains in a packet switched communication network, which receives and forwards packets to and from the connected segments or networks. Although similar in general to a packet bridge, a router provides more intelligent capabilities, for example, to select the next hop (and thus the appropriate output port) for each received packet based on programmed policies or routing algorithms.

To route a packet, a router or the like analyzes address information contained in a header of the packet and determines the port through which to output the packet, and thus the next to the next network node on the packets path through the network. In Internet Protocol (IP) type communications, the header of each packet contains a source address and a destination address. In the addressing scheme of the Internet, a complete source or destination address comprises four numbers separated by dots. This is called the Internet Protocol address, or IP address. An example of the decimal form of an IP address would be 253.132.416.212.

32-bit IP addresses are represented as four 8-bit fields separated by periods. Each such 8-bit field can represent one of 256 numbers, namely 0-255 in decimal notation.

Each machine on the Internet has a unique number assigned to it, in the above-discussed IP address format. There are multiple "classes" of IP addresses. In one class, for example, the first 24 (most significant) bits represent a "network" (the network portion of the address) and the last 8 bits represent the "host" portion of the address (so that, for each network of the class of addresses, there are at most 256 host devices participating in it).

In addition to voice grade telephone services, analogous to those provided by an existing IS-95 type cellular network, the network 100 supports packet data services conforming to the common Internet Protocol (IP). As part of its support for IP packet data services, the network 100 uses and processes IP addresses of the format discussed above. For example, a number of nodes of the network include router functionality, as will become more apparent later. Other nodes of the network administer such addresses. To understand the address processing involved in the present concepts, it may be helpful to briefly consider several ways in which the exemplary network 100 administers IP addresses for non-static mobile data service subscribers.

Network 100 may support both Simple IP (SIP) and Mobile IP (MIP) types of address management services for mobile customers that subscribe to the packet data communications. Simple IP (SIP) is a service in which the user is assigned a dynamic IP address from the serving PDSN router. A service provider network provides the user's mobile station with IP routing service. The user's mobile station retains its dynamically assigned IP address as long as that station is served by a radio network, which has connectivity to the PDSN that assigned the IP address to the that mobile station. There is no IP address mobility beyond this PDSN, and as a result, there is no handoff between PDSNs. Mobile IP address service also provides dynamic address assignment, but it allows the station to roam during a data communication session yet maintain the address assignment.

The static IP service may utilize some dynamic assignment protocols. The preferred implementation of the static IP service for the network 100 utilizes the MIP service operations, therefore a more detailed discussion thereof may be helpful here. Mobile IP (MIP) is a service in which the subscriber is assigned an IP address from a "home" network (e.g., home agent (HA) 123 of network 110). With MIP service, the assigned IP address does not change as the mobile station changes it's point of attachment to the network 100 (e.g. by roaming to a new provider network, or by roaming across a PDSN boundary within a single provider's network). If dynamically assigned, the IP address remains assigned to the particular mobile station until that station logs-off, is inactive for longer than some set period, or the data session is otherwise terminated. Therefore, with respect to FIG. 2, with MIP MS 105 maintains its IP address when roaming from network 110 to network 150.

In accord with the present concepts, the assigned address provided to the static subscriber's mobile station by the MIP service functionality is in fact always the subscriber's static address, obtained from a subscriber profile maintained in an appropriate network node. Although the address may be repeatedly downloaded to the subscriber's mobile station, for different packet communication sessions, the static IP subscriber's mobile station always receives and uses the same address, and parties sending data packets to the mobile station always use the same static IP address as the destination address in the IP packets intended for that mobile station.

Although the static IP addresses could be provided from other network nodes, for efficiency, they are provided from the AAA server maintaining the static subscriber's account record. For that purpose, the AAA servers maintain subscriber profile record databases. As subscribers and their mobile stations are validated, for packet data services, the AAA servers check the subscribers' profiles to recognize those that subscribe to the static IP address service. As outlined above relative to FIG. 1, the static address is downloaded to a mobile station, and preferably the profile further provides the IP address of the subscriber's home agent, as part of the MIP processing.

The "visited" access provider network 150 includes physical radio networks, such as RN 151 of FIG. 2. RN 151 comprises at least one BTS 153 and BSC 155 for wireless communications with mobile stations, which are substantially the same in the illustrative embodiment as BTS 113 and BSC 117 of RN 111. RN 151 also includes a MSC-157, which is similar to MSC 117 in RN 111. RN 151 serves as the "home" network for some mobile stations (not shown) and provides roaming service for customers that visit the geographic area served by the access provides network 150, such as MS 105.

The access provider network 150 also includes a PDSN 159 and an AAA server 161, similar to those in network 110. For stations "homed" on RN 151, PDSN 159 acts as a home agent (HA) for packet service, and PDSN 159 interacts with an AAA server 161 in a manner analogous to that described above with regard to PDSN 119 and AAA server 121. However, for the roaming MS 105, PDSN 159 acts as a foreign agent (FA), and server 161 acts as a visited AAA server.

AAA servers are used for authentication, authorization and accounting functions for packet data calls in a CDMA2000-1x network. Both access provider networks 110 and 150 include one or more of such AAA servers (i.e., servers 121 and 161, respectively) and there may be one or more third party trusted AAA servers 141 that serve as proxies for communications between AAA servers of different access providers. The AAA servers provide authentication for both Simple IP and Mobile IP, including the static IP address service. These servers authorize service subscriptions, service profiles, and customized services. These servers also perform a variety of accounting functions, including starting an accounting record, maintaining an interim accounting record, and stopping an accounting record for a packet data communication service.

In the preferred implementation of the network 100, all authentication, authorization and accounting transactions are performed using a RADIUS protocol of the IS-835 standard. The RADIUS protocol has been in use for many years and is used widely in ISP networks. In the access provider network 110, RADIUS is implemented only as client-server in which PDSN 119 acts as the client and AAA 121 as the server. Similarly, in the access provider network 150, RADIUS is implemented only as client-server in which the PDSN 159 acts as the client and AAA 161 as the server.

During registration of roaming subscribers, it becomes necessary to conduct certain transactions between AAA servers 121 and 161. These communications may be conducted directly via the IP network 171 or the like. In many cases, however, the AAA server 121 or 161 in each respective network 110 or 150 will communicate via the IP network 171 with the secure broker server 141 acting as a AAA proxy server. The IP network 171 could be a public network, such as a portion of the public Internet. However, because of the mission-critical nature of the AAA communications and the security and finance-related issues involved in such communications, the IP network 171 preferably is a secure packet communication network operated by one or more carriers or their trusted service providers.

The mobile stations are provisioned to normally operate in the serving area of one wireless system operated by the user's access service provider, and this radio system is referred to as the "home" location or system. In our example, RN 111 within the access provider network 110 is provisioned as the "home" system for both of the exemplary mobile stations 103 and 105. Within the access provider network 110 providing the "home" service for MS 103 and MS 105 is a Home Location Register (HLR) 125 that stores subscriber packet data subscription service options and terminal capabilities, i.e., regarding subscription to CDMA2000-1x, IS-95, voice, packet data, dual mode, dual service voice and packet data. The home RN 111 uses the service information from the HLR 125 to provide the subscribed services to each user's mobile station, for example while the MS 103 is operating in the service area of the home RN 111. Although not shown, the access provider network 150 typically may include one or more additional servers for storing similar HLR service information for mobile stations homed to radio networks, such as RN 151, of that access network 150. All radio networks of one access provider network may utilize one server for the HLR function.

As shown, the customer using MS 105 has roamed into the service area of the visited access provider network 150. For MS 105, service information is downloaded from the HLR 125 to the Visitor Location Register (VLR) 165 in visited access network 150 during a successful registration process. Specifically, the visited wireless communication network 150 assigns a register in server 165, as a VLR, to a mobile station, in this case MS 105, during a period when the mobile station roams into the wireless serving area of the network 150 and remains registered on that visited system. By doing so, proper services to roaming MS 105 are provided.

VLR 165 communicates with HLR 125 to authenticate MS 105 and to obtain a copy of MS 105's subscriber subscription service information, including packet data service information, from the HLR during the registration process. Typically, this is accomplished by packet message exchange via a SS7 interoffice signaling network 173. This communication is analogous to roaming registration authentication conducted today in both analog and digital cellular communication networks, although the communication here includes the extra information relating to the subscriber's packet data service.

Subsequently, when the subscriber using MS 105 initiates an actual packet data session, BSC 155 first goes to VLR 165 via the MSC 157 to check subscriber subscription information prior to granting the service to the subscriber. If the mobile station is not yet registered, this would initiate the registration procedure. However, if registration has been completed when the subscriber attempts the packet data communication, VLR 165 will provide the requisite authorization based on checking the downloaded subscriber subscription information, and then allow communications to go to PDSN 159 for further processing specifically related to the data services.

Although not shown, network 110 typically includes a similar VLR functionality. If successfully validated, the subscriber seeking packet data services then goes through a routine to log into the packet data service. The packet service log-in entails a validation procedure through the AAA servers. As part of the MIP service, the AAA server will provide a home agent address, and the home agent will provide an IP address. In accord with the static IP address service, both of these addresses will come from the static IP subscriber's profile record in the database maintained by the appropriate one of the home AAA servers, using a process similar to that discussed above relative to FIG. 1.

In the example, the home access provider network 110 also includes a short message service center (SMSC) 127. The SMSC receives messages, such as e-mail, intended for transmission to mobile stations and forwards them to the appropriate MSC 117 or 157. The SMSC 127 receives the messages over an IP network, such as network 171 or the Internet. The links to the MSCs typically go through an SS7 network such as that shown at 173, although the link to the MSC 117 is shown separately for convenience. A similar SMSC server or control computer (not shown) may be provided in the visited access provider network 150 to allow that provider to offer short message service (SMS) to subscribers whose stations are assigned to home systems 151 within network 150. The SMSC 127 is a standard messaging computer used in cellular networks today to offer SMS services to cellular customers. Such SMSCs 127 will provide similar services to the newer mobile stations that also support the packet data services.

As another example, assume that the MS 105 has roamed across a PDSN boundary from network 110 to network 150 using a MIP service, e.g. using the subscriber's static address. Although originally given its static address via PDSN 119, MS 105 will obtain packet data services via PDSN 159. As it roams across the boundary, the MS 105 must obtain a "care-of address" (COA) from a local "Foreign Agent" (FA), and register this COA with it's "Home Agent" (HA) on the home network. Although other control nodes or routers may perform these Agent functions, in the illustrative embodiment the PDSNs 119 and 159 serve as these Agents. The COA address allows the HA 123 to route packets with the assigned mobile IP address through the PDSN/FA router 159 to the visited RN 151, and hence, to the roaming MS 105.

In this example, HA 123, will subsequently intercept all incoming traffic for the mobile station 105 and forward it to the mobile station at its new COA, that is to say via the PDSN 159. Outgoing traffic from the mobile station 105 is typically addressed as normal and routed directly from the PDSN 159 to the destination "correspondent node" (CN) from the "foreign" network. This routing path (MS→FA→CN, CN→HA→FA→MN) is referred to as "triangular routing". An option is for a "reverse tunnel" to be established between the FA and HA, so that all outgoing traffic from the mobile station 105 appears to originate on its home network 110.

The MS 105 is able to maintain a static IP address even for hand-off between radio networks connected to separate PDSN nodes, such as RNs 111 and 151 and PSDNs 119 and 159. Therefore, Mobile IP provides hand-off capability, and enables MS 105 to roam in the public IP network, rather than just within the footprint of its home access provider. Of course, where the MIP service provides a download of the static IP address, the MS 105 in fact uses the same static IP address throughout all of its packet data communication sessions.

The static address service, for packet data communications through the wireless network, may utilize any appropriate hardware for the client and server systems. In the network discussed above, the clients would typically be the portable digital terminals (mobile stations) although in some cases, the client stations may take the form of general purpose computers connected to or incorporating wireless communication devices. Preferred embodiments of the server systems, such as the AAA servers, utilize general purpose computers in the form of servers or host computers or in the form of personal computers (PCs). It is presumed that readers are familiar with the structure and operation of these various electronic devices. However, for completeness, in may be helpful to provide a summary discussion here an exemplary mobile telephone device and of certain of the general purpose computers.

Figure 3B:
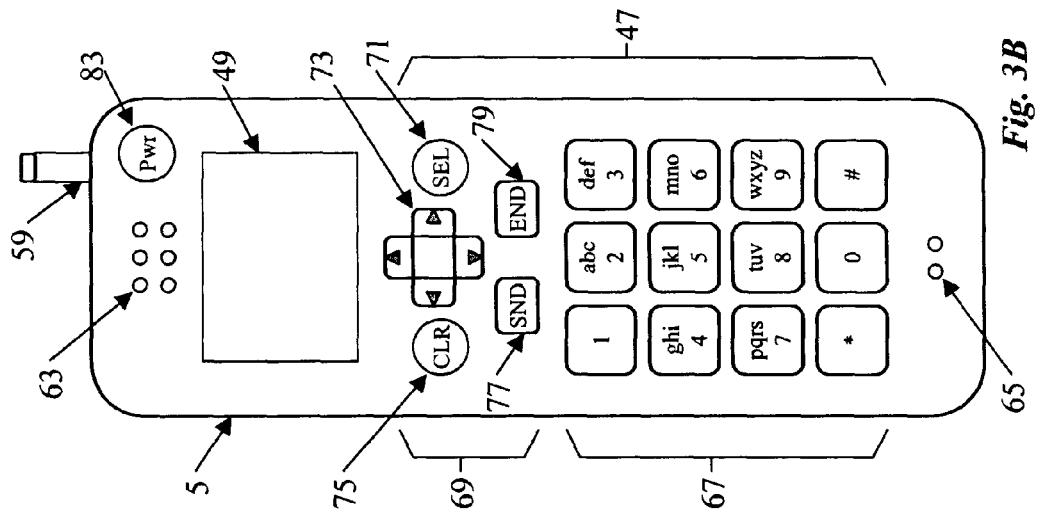
FIGS. 3A and 3B are diagrams of an exemplary mobile station, which may operate in the network of FIG. 2.
Figure 3A:
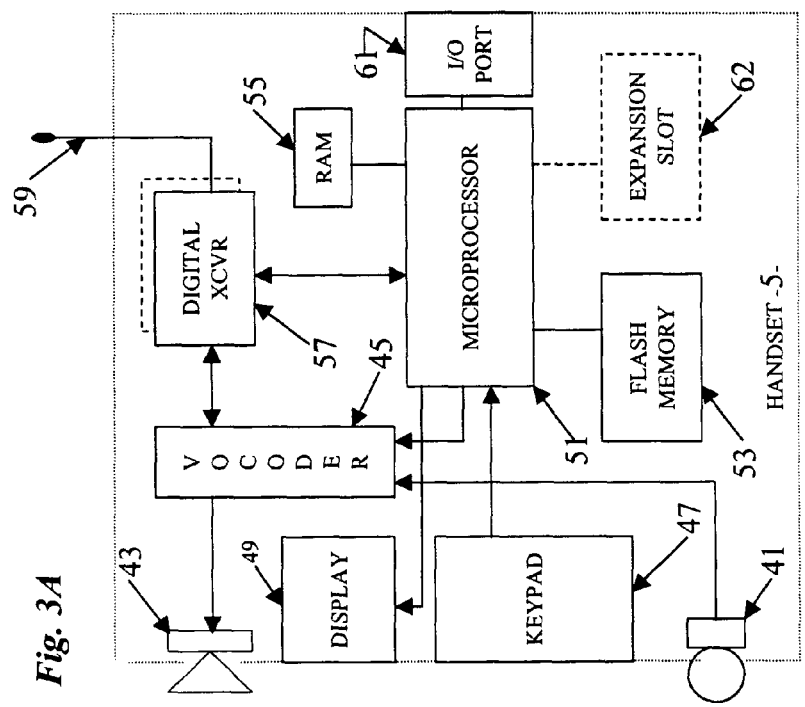

FIG. 3A is a functional block diagram of a simple mobile communication device 5 for use in the network of FIG. 2, and FIG. 3B is a plan view of the front of one exemplary embodiment of such a device. Although the mobile station 5 may be incorporated into a vehicle mounted mobile unit or into another device, such as a PDA or a portable personal computer, for discussion purposes the illustrations show the station in the form of a handset.

The handset 5 functions as a normal digital wireless telephone station. For that function, the station 5 includes a microphone 41 for audio signal input and a speaker 43 for audio signal output. The microphone 41 and speaker 43 connect to voice coding and decoding circuitry (vocoder) 45. For a voice telephone call, for example, the vocoder 45 provides two-way conversion between analog audio signals representing speech or other audio and digital samples at a compressed bit rate compatible with the digital protocol of the wireless telephone network communications.

For digital wireless communications, the handset 5 also includes a digital transceiver (XCVR) 57. The invention encompasses embodiments utilizing any digital transceivers that conform to current or future developed digital wireless communication standards. For example, the transceiver 57 could be a TDMA or GSM unit, designed for cellular or PCS operation. In the preferred embodiments, the digital transceiver 57 is a CDMA transceiver that complies with the 1xRTT standard and is capable of operating via the network of FIG. 2. The transceiver 57 provides two-way wireless communication of information, such as vocoded speech samples and digital message information. The transceiver 57 connects through RF send and receive amplifiers (not separately shown) to an antenna 59. The station 5 may include one or more additional transceivers, as shown in dotted line form, for operation in an analog mode or in accord with an alternative digital standard.

As shown, the digital telephone handset 5 includes a display 49 for displaying messages, a menu generated by a client browser program, call related information, dialed and calling party numbers, etc. For the some services involving packet data communication, the display 49 may also display application elements, such as e-mail mailboxes and messages, web pages, and the like. A keypad 47 enables dialing digits for voice and/or data calls and generating selection inputs keyed by the user based on displayed menu. The display and keypad may also offer a "point and click" functionality, for example, to select links from displayed web pages.

A microprocessor 51 controls all operations of the handset 5. The microprocessor 51 is a programmable device. The mobile unit 5 also includes a flash memory 53 alone or in combination with a read only memory (ROM) and/or a non-volatile random access memory (RAM) 55, for storing various software routines and mobile configuration settings, such as mobile identification number (MIN), etc. In a present implementation, the random access memory RAM 55 stores an operating system, vocoder software, client browser software, device driver software, call processing software, short message service software, and the like. The memories also store data, such as telephone numbers and other data input by the user via the keypad 47.

The configuration data storage in the RAM 55 also includes locations for provisioned values for the station's own IP address and the home agent IP address. For MIP services, including that providing static IP addressing, these locations in the RAM 55 contain the default values (e.g. 0.0.0.0 and 255.255.255.255), for example, as programmed into the memory by the manufacture. The registers of the processor and/or the RAM will also provide temporary storage for working data, in this case, including storage for downloaded values of the IP address and the home agent IP address for the station to use during a given packet data communication session.

The handset 5 may also include an optional expansion slot, to add memory elements or to add other user selected functional elements.

FIG. 3B shows the front of the cellular mobile station 5, in the form of a portable handset. As shown, the handset housing includes openings 63 enabling sound to emerge from the speaker 43, as well as openings 65 to allow input of sound to the microphone 41.

The handset 5 includes the visible display screen 39. The handset 5 also includes various keys making up the keypad 47. The keypad 47 typically includes at least two sets of keys 67, 69. The keys 67 represent dialing-input keys. Typically, each of the twelve keys 67 is imprinted with a number from 1 to 0, an asterisk or star (*) or a number sign (#). Each of the keys 67 numbered 2 through 9 also is imprinted with three or four letters, to enable input of alphabetical information.

The keys 69 are function keys. The exemplary set of function keys include a menu scrolling key 73, a selection (SEL) key 71, a clear (CLR) entry key 75, a send (SND) key 77 and an END key 79. The send (SND) key 77 is used to initiate or answer a wireless call, and the "END" key 79 is used to terminate a wireless call.

Although other keys with other functions and/or labels may be used in place of or in addition to those shown, FIG. 3B shows three function keys for input of information to and retrieval of information from the processor and memory of the handset and/or selection of features from a menu shown on the display 49. One of these keys is the two-way scrolling key 73, for controlling up and down movement of a displayed cursor or highlight function and attendant scrolling of menus shown on the display 49. The exemplary keys also include the selection (SEL) key 67, which enables a user to select an option indicated by the cursor or highlighting. The clear (CLR) key 69 enables the user to erase a selection. A wide variety of other cursor controls and selection inputs could be used.

The user operates a power (Pwr) key 83 to toggle the handset 5 on and off.

The keypad 47 supplies user input information to the microprocessor 51, and the microprocessor provides digital data signals to cause the display to show appropriate information to the user. Under control of the microprocessor 51, the display 49 shows textual information, such as dialed numbers and name and number information regarding stored speed dialing lists. The display 49 also may have certain specialized indicators, such as a message-waiting indicator and various roaming or home service indicators. Hence, under control of the microprocessor 51 and its programming, the keypad 47 and the display 49 provide a user interface allowing the customer to input information and receive information.

To make a routine telephone call, for example, a user dials in the destination number by actuating the appropriate ones of the number keys 67 and then pushes the send (SND) key 77. As the user presses the number keys, the microprocessor 51 causes the screen 49 to display the dialed number. When it senses the actuation of the send (SND) key 77, the microprocessor 51 generates a call request message in the appropriate protocol. This message includes the dialed destination number. The microprocessor 51 causes the digital transceiver 57 to send the message, as a signaling message, for example over the signaling channel of the particular wireless air-interface to a base station, for call set-up processing by the network 3.

The user interface through the keypad 47 and the display 49 also allow the user to input and receive data, which the handset may communicate through the network (FIG. 2) using the digital transceiver 57. The handset 5 also includes an I/O port 61 coupled to the microprocessor 51, to allow exchange of data between the microprocessor and an external data device. Through this port, the handset may serve as a data modem for an attached device, such as a laptop computer or a personal digital assistant. As a result, the handset 5 can provide mobile access to packet data communications services available from the wireless network.

Figure 4:
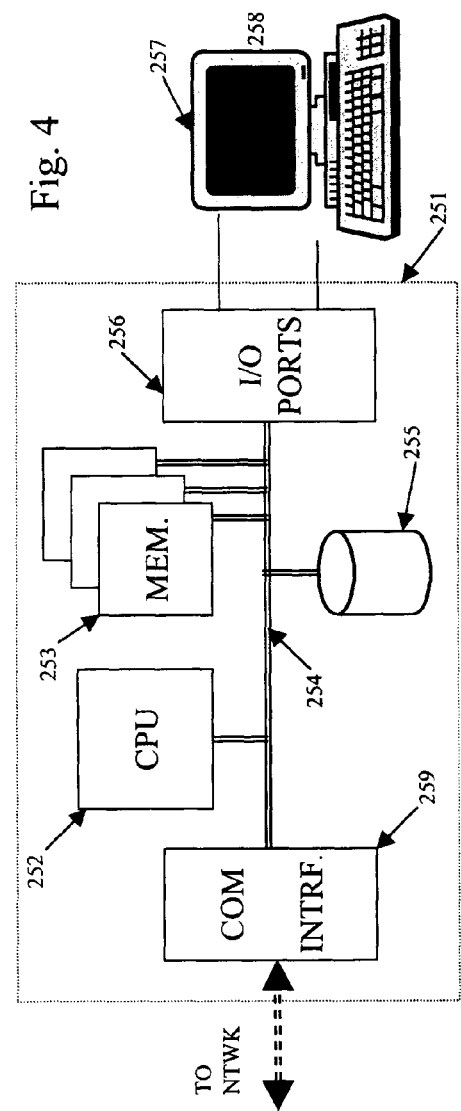
FIG. 4 is a functional block diagram of a personal computer or similar data terminal device.

FIG. 4 is a functional block diagram of a PC or workstation type implementation of a system 251, which may serve as a client device connecting to a mobile station, as a technical support or provisioning tool for loading the subscriber profile database, or in some smaller network implementations as the actual database server.

The exemplary computer system 251 contains a central processing unit (CPU) 252, memories 253 and an interconnect bus 254. The CPU 252 may contain a single microprocessor, or may contain a plurality of microprocessors for configuring the computer system 252 as a multi-processor system. The memories 253 include a main memory, a read only memory, and mass storage devices such as various disk drives, tape drives, etc. The main memory typically includes dynamic random access memory (DRAM) and high-speed cache memory. In operation, the main memory stores at least portions of instructions and data for execution by the CPU 252.

The mass storage may include one or more magnetic disk or tape drives or optical disk drives, for storing data and instructions for use by CPU 252. For a home PC, for example, at least one mass storage system 255 in the form of a disk drive or the like, stores the operating system and application software and well as data, including received messages and documents. The mass storage 255 within the computer system 251 may also include one or more drives for various portable media, such as a floppy disk, a compact disc read only memory (CD-ROM), or an integrated circuit non-volatile memory adapter (i.e. PC-MCIA adapter) to input and output data and code to and from the computer system 251.

The system 251 also includes one or more input/output interfaces for communications, shown by way of example as an interface 259 for data communications via the network. The interface 259 may be a modem, an Ethernet card or any other appropriate data communications device. If providing client functions involving wireless communications, the interface 258 might incorporate many of the elements of a mobile station, such as station 5 discussed above relative to FIG. 3A. If serving as a node of the network 100, for example, if operating as a server or PDSN, the communication interface might include one or more local area network cards or the like for connection to the carrier's private IP network and/or one or more cards for communication via another standard signaling network if used by the carrier(s). The physical communication links may be optical, wired, or wireless (e.g., via satellite or cellular network).

The computer system 251 may further include appropriate input/output ports 256 for interconnection with a display 257 and a keyboard 258 serving as the respective user interface. For example, the computer may include a graphics subsystem to drive the output display 257. The output display 257 may include a cathode ray tube (CRT) display or liquid crystal display (LCD). Although not shown, the PC type system typically would include a port for connection to a printer. The input control devices for such an implementation of the system 251 would include the keyboard 258 for inputting alphanumeric and other key information. The input control devices for the system may further include a cursor control device (not shown), such as a mouse, a trackball, stylus, or cursor direction keys. The links of the peripherals 257, 258 to the system 251 may be wired connections or use wireless communications.

Each computer system 251 runs a variety of applications programs and stores data, enabling one or more interactions via the user interface, provided through elements such as 257 and 258, and/or over the network 23 to implement the desired processing for the estimation service or the processing of requests for promotional services. If operating as a customer's computer, for example, the system 251 runs a general purpose browser application and/or a separate e-mail program, and the like, which require packet data communications. If used as a technician's terminal to provision elements of the network 100, the system 251 may also run one or more specialized network administration applications. For some purposes, the system may also run a server application.

Figure 5:
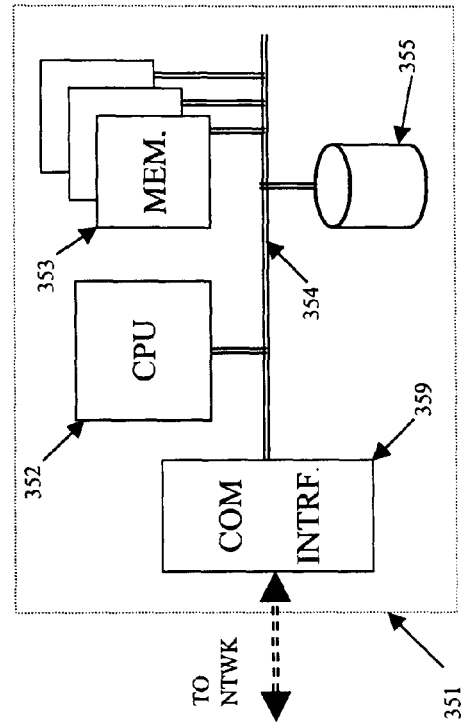
FIG. 5 is a functional block diagram of a server, which may serve as one or more of the nodes of the network of FIG. 2.

FIG. 5 is a functional block diagram of a general purpose computer system 351, which may perform the functions of the AAA server, the HLR, the home agent (if separated from the PDSN functionality) or the like. The exemplary computer system 351 contains a central processing unit (CPU) 352, memories 353 and an interconnect bus 354. The CPU 352 may contain a single microprocessor, or may contain a plurality of microprocessors for configuring the computer system 352 as a multi-processor system. The memories 353 include a main memory, a read only memory, and mass storage devices such as various disk drives, tape drives, etc. The main memory typically includes dynamic random access memory (DRAM) and high-speed cache memory. In operation, the main memory stores at least portions of instructions and data for execution by the CPU 352.

The mass storage may include one or more magnetic disk or tape drives or optical disk drives, for storing data and instructions for use by CPU 352. At least one mass storage system 355, preferably in the form of a hard disk drive or the like, stores the database of subscriber profile records for the AAA and static IP service functions. The mass storage 355 may also include one or more drives for various portable media, such as a floppy disk, a compact disc read only memory (CD-ROM), or an integrated circuit non-volatile memory adapter (i.e. PC-MCIA adapter) to input and output data and code to and from the computer system 351.

The system 351 also includes one or more input/output interfaces for communications, shown by way of example as an interface 359 for data communications via the network 23. The interface 359 may be a modem, an Ethernet card or any other appropriate data communications device. To provide the AAA server functionality, the interface 359 preferably provides a relatively high-speed link to the IP based private network used to carry signaling and packet communications for the service provider(s) operating the overall network 100 of FIG. 2. The physical communication link may be optical, wired, or wireless (e.g., via satellite or cellular network). Alternatively, the computer system may comprise a mainframe or other type of host computer system capable of implementing the AAA server functionality and the appropriate signaling communications.

Although not shown, the system 351 may further include appropriate input/output ports for interconnection with a local display and a keyboard or the like serving as a local user interface for programming purposes. Alternatively, the server operations personnel may interact with the system 351 for control and programming of the system from remote terminal devices implemented by computers like system 251, via an intranet or the Internet.

If providing the AAA server functionality, the computer system 351 runs a variety of applications programs and stores a database of subscriber profiles. One or more of the applications enable the receipt and delivery of the messages to enable operation as the appropriate server, for implementation of server functions relating to AAA, MIP service and the associated static IP service, as discussed above.

The components contained in the computer systems 251 and 351 are those typically found in general purpose computer systems used as servers, workstations, personal computers, network terminals, and the like. In fact, these components are intended to represent a broad category of such computer components that are well known in the art.

Certain aspects of the invention relate to the software elements, such as the executable code and database for the AAA server functions of the static key downloading, in the exemplary implementations discussed above. The concepts relate to methods, networks and systems for dynamically downloading a user's static packet network address, typically, the user's static IP address, in a public wireless network service. It is also envisioned that the download will provide a home agent address for use by the mobile station. Other aspects of the concepts relate to unique software products for implementing the address processing functions for the static IP service, for execution on a programmed computer or router serving as an appropriate node of the wireless network, such as a AAA server, although the functionality may reside in other network elements.

A "software product" includes information carried by at least one machine-readable medium. The information carried by the medium may be executable code for implementing the address related technique(s) and/or one or more databases of subscriber profile records and address related information. A computer or machine "readable medium," as used herein, may be any physical element or carrier wave, which can bear instructions or code for performing a sequence of steps in a machine-readable form or associated data. Examples of physical forms of such a medium include floppy disks, flexible disks, hard disks, magnetic tape, any other magnetic storage medium, a DVD-ROM, CD-ROM, any other optical medium, a RAM, a ROM, a PROM, an EPROM, a FLASH-EPROM, any other memory chip or cartridge, as well as media bearing the software in a scannable format. A carrier wave type of medium is any type of signal that may carry digital information representative of the data or the instructions or code for performing the sequence of steps. Such a carrier wave medium may be received via a wireline or fiber-optic network, via a modem, or as a radio-frequency or infrared signal, or any other type of signal which a computer or the like may receive and decode. At different times all or portions of the executable code or database for any or all of these software elements may reside in physical media or be carried by electromagnetic media or be transported via a variety of different media to program the particular system. For example, all or portions of the software may at times be communicated through the Internet and/or various other telecommunication networks for loading thereof into the appropriate AAA server or other node performing all or a part of the static packet address downloading operations.

3. Detailed Discussion of Call Flow in Exemplary Network

Figure 6:
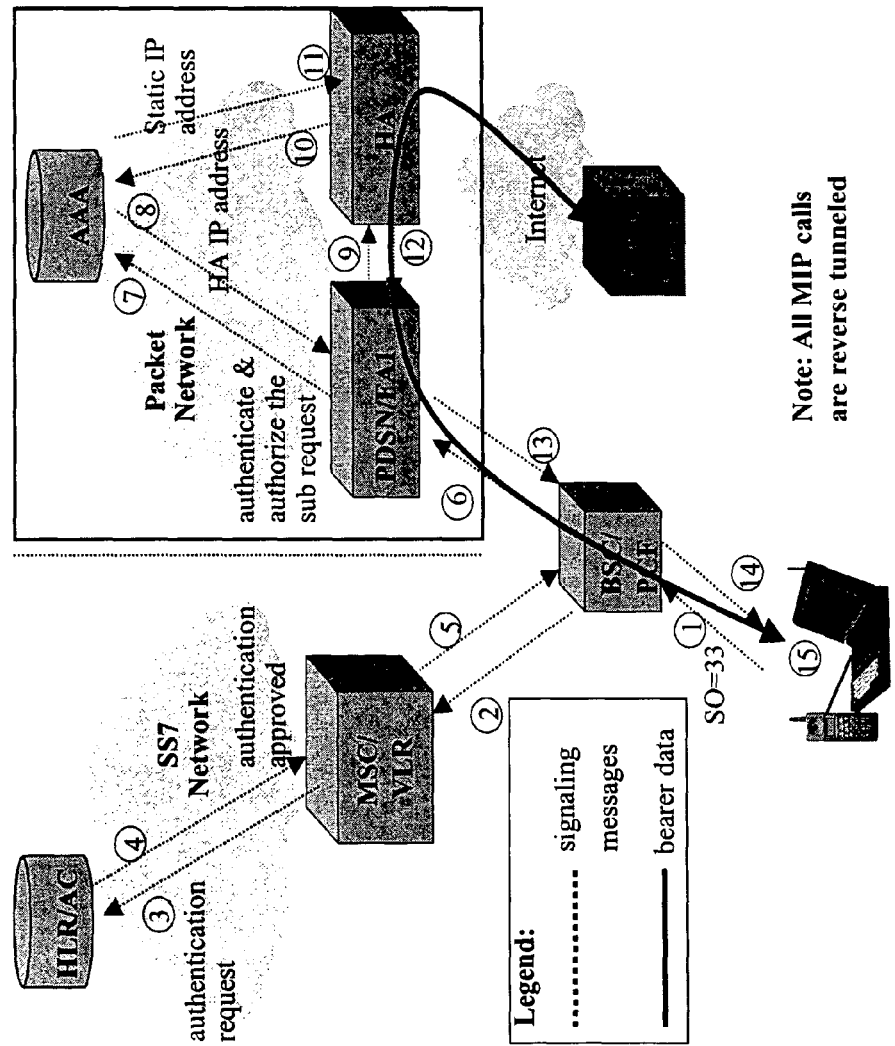
FIG. 6 is a flow diagram illustrating the specific steps that may occur in a mobile IP type call flow for providing a static address to a subscriber's mobile station, in a network of the type depicted in FIG. 2.

Having discussed an exemplary network infrastructure and the hardware and software that may be used in such a network, it may be helpful to go through a detailed example of a call flow, involving static IP address downloading, in the exemplary network infrastructure. FIG. 6 is a simplified diagram of the network, with signal flows overlaid on top of the network elements, which is useful in explaining a call flow through the network of FIG. 2 with static IP downloading. In the example, it is assumed that the owner/operator of the mobile station is a static IP address service subscriber. Although the present concepts are applicable to incoming (push) data communications, for discussion purposes, it is assumed that the user desires to initiate a data communication session from the mobile station (a "pull" data session).

In step 1 of this call, the mobile station "MS" requests to access the IX data network by sending Service Option 33 over the wireless link, through the base station to the BSC. A service option is a standard level of service offered for a particular type of call through the radio access network. A normal packet data call, for e-mail or browsing, for example, utilizes Service Option 33 (SO33). By contrast, a normal voice-grade telephone call utilizes Service Option 3 (SO3).

In steps 2-5, the mobile station goes through regular Authentication and Registration processes with AC/HLR via the MSC/VLR. Through this series of steps, the serving network ensures the MS is an authorized subscriber. At step 6, the packet control function (PCF) requests establishment of the IX data service for this mobile device through a particular PDSN. This PDSN will serve as the foreign agent (FA) for the mobile station during this packet data communication session.

At step 7, the PDSN/FA creates a PPP session and sends an authentication and authorization request to the home AAA server. At step 8, the home AAA server authenticates and authorizes the subscriber (based on MN-AAA). The AAA server determines how to process the request based on the subscriber profile data in its database, in this case, based on an indication in the profile that the mobile station is a station of a static IP service customer. Since the subscriber is a static IP subscriber, the AAA server retrieves the pre-provisioned HA IP address from the subscriber's profile. The HA IP address is the one that the provider has most recently selected for otherwise statically providing HA service for the particular mobile station. The HA IP address is relatively static in that is does not change with every session established for the subscriber, but it may still be changed from time to time by the carrier/service provider, by changing the HA IP address in the subscriber's profile record, for example, when the carrier desires to move the customer's service to a different HA network node. In step 8, the AAA server sends the pre-provisioned HA IP address to the PDSN currently serving as a foreign agent (FA) for the mobile station.

In step 9, the PDSN/FA sends the MIP RRQ to the selected home agent (HA), typically another router, using the HA IP address received from the AAA server in the preceding step. In step 10, the HA asks the AAA server for the MN-HA key, in order to authenticate the subscriber. Since this is a static IP subscriber, in step 11, the AAA server sends back the pre-provisioned static IP address to the HA, along with the MN-HA key. In a normal MIP type service, the home agent would select an IP address from among the available addresses in its pool, to temporarily assign to the requesting mobile station. However, for the static IP service, the messaging and/or the programming of the home agent are modified to allow that node to recognize that the mobile station should be assigned an IP address from the appropriate field of the message it received in step 11.

The HA authenticates the subscriber, in the normal manner. In steps 12-14, the HA sends the IP address for the mobile station and the HA IP address to mobile station, through the PDSN/FA, the BSC/PCF and the wireless link. At step 15, the mobile station starts to send data information over the network, including through the public Internet or to/from a private intranet, using the downloaded static IP address as its own address. In outgoing packets, it uses the received static IP address as its source address, and parties sending data to the mobile station use the address the downloaded static IP address as the destination address.

In the example, the mobile station MS operated exactly as it would for a dynamic assignment of an address in a MIP type service, that is to say, starting with the stored default values for its own IP address and for its home agent IP address. The intelligence to keep the station IP address and to download the relatively static home agent IP address for all packet communications for this mobile station MS reside in one or more nodes of the wireless communication network.

4. Detailed Discussion of Call Flow in Alternate Network

Another form of wireless network infrastructure, supporting IP packet data services is the 1x EVDO type network, as defined in the TIA/EIA/IS-856 standard covering high data rate (HDR) packet data networks. In this type of network, the forward link channel structure intermixes both code and time multiplexed channels. The data is transmitted on the forward link, for example, over a time division multiplexed carrier at fixed data transmit powers but at variable data rates. Measured signal to interference ratio (SIR) at the receiver is used to determine a data rate which can be supported by the receiver, preferably, the maximum data rate at which a minimum level of quality of service can be achieved at the wireless station.

For purposes of this discussion here, the 1xEVDO network will include a AAA server, and PDSN and a home agent (HA) as in the networks of FIGS. 2 and 6. However, the radio link control functions are implemented in a radio network controller RNC. Also, elements such as the MSC, HLR and VLR carried over from older voice service infrastructures into the 1xRTT network of FIG. 2, may no longer be present in the 1xEVDO network.

Figure 7:
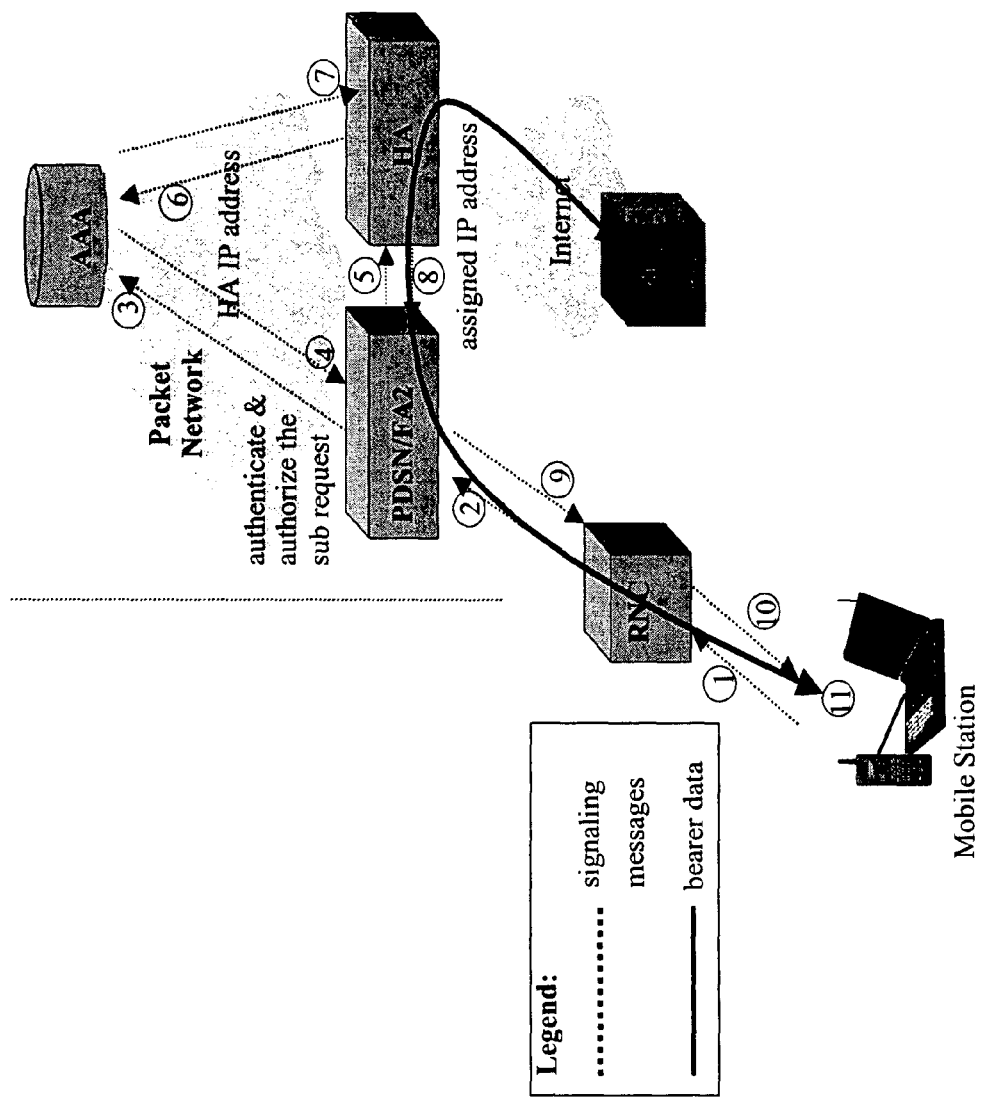
FIG. 7 is a flow diagram illustrating the specific steps that may occur in a mobile IP type call flow for providing a static address to a subscriber's mobile station, in another network that offers mobile/wireless packet data communication services.

In the call processing example of FIG. 7, the packet data call again begins (at step 1) when the MS requests data service from the network, in this case the EVDO data network. At step 2, the radio network controller (RNC) computes an International Mobile Subscriber Identity (IMSI) for the particular subscriber, and the RNC requests set-up of the EVDO data service via a particular PDSN using the IMSI hashing algorithm. At step 3, the serving PDSN/FA creates a PPP session, and through that session, the PDSN/FA sends an authentication and authorization request to the home AAA server. In response (at step 4), the home AAA server authenticates and authorizes the subscriber (based on MN-AAA) and provides a responsive message.

As in the earlier examples, the functions performed by the AAA server involve accessing a subscriber profile record for the subscriber associated with the mobile station and determining that the subscriber is a static IP subscriber. One or more necessary packet addresses are therefore retrieved from the profile. Since the subscriber is a static IP subscriber, the AAA server sends the pre-provisioned HA IP address to the PDSN/FA, that is to say, the HA IP address currently programmed into the subscriber's profile. The AAA server sends that static address to the PDSN/FA as part of the response message in step 4. At step 5, the PDSN/FA sends the MIP RRQ message to the selected HA. In response (step 6), the HA asks the AAA server for the MN-HA key, in order to authenticate the subscriber.

Since this is a static IP subscriber, in step 7, the AAA server sends back the subscriber's pre-provisioned static IP address to the HA, along with the MN-HA key. The HA authenticates the subscriber. As in the earlier example, the home agent is programmed to assign the address received in the message from the AAA server to the static address subscriber's mobile station. Hence, in steps 8-10, the HA then sends the IP address and HA IP address to mobile station through the PDSN/FA, the RNC and the air link. At step 11, the mobile station starts to send data information over the network, including through the public Internet or to/from a private intranet, using the downloaded static IP address as its own address. In outgoing packets, it uses this address as its source address, and parties sending data to the mobile station use the address the downloaded static IP address as the destination address.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method of providing a static address service for packet data communication through a wireless network, comprising:

receiving a request for packet data communication service through the wireless network, from a mobile station of a requesting subscriber;

accessing a profile record for the requesting subscriber, in a database of wireless service subscribers;

responsive to the accessed profile record indicating that the requesting subscriber subscribes to the static address service, obtaining a static packet communication address of the requesting subscriber from the accessed profile record; and downloading the static packet communication address obtained from the accessed profile record through the wireless network, for use by the mobile station in packet data communication through the wireless network.

2. The method of claim 1, wherein the static packet communication address comprises a statically assigned internet protocol (IP) address.

3. The method of claim 1, further comprising:
responsive to the accessed profile record indicating that the requesting subscriber subscribes to the static address service, obtaining a packet communication address of a node of the wireless network assigned to serve as a home agent for the requesting subscriber, from the accessed profile record; and
transmitting the packet communication address of the home agent obtained from the accessed profile record to a packet data serving node (PDSN) involved in establishment of the packet data communication service through the wireless network for the mobile station and to the mobile station.

4. The method of claim 3, wherein the packet communication address of the home agent comprises an internet protocol (IP) address of the node assigned to serve as the home agent for the requesting subscriber.

5. The method of claim 1, wherein the step of accessing the profile record for the requesting subscriber is associated with a step of validating authentication or authorization of the mobile station to receive the requested packet data communication service through the wireless network.

6. A method of providing a static address service for packet data communication through a wireless network, comprising:
receiving a request for packet data communication service at a packet data serving node (PDSN) of the wireless network, from a mobile station of a requesting subscriber;
sending a validation request message identifying the mobile station from the PSDN to an Authentication, Authorization and Accounting (AAA) server;
in response to the validation request message, accessing a profile record for the requesting subscriber, in a database of profile records of wireless service subscribers;
responsive to the accessed profile record indicating that the requesting subscriber subscribes to a static address service, obtaining a packet communication address of a node of the wireless network assigned to serve as a home agent for the requesting subscriber, from the accessed profile record;
sending the packet communication address of the home agent to the PDSN;
sending a service request message identifying the mobile station from the PSDN to the home agent, using the packet communication address of the home agent;
in response to the service request message, obtaining a static packet communication address of the requesting subscriber from the accessed profile record;
sending the static packet communication address obtained from the accessed profile record to the PDSN;
downloading the static packet communication address and the packet communication address of the home agent obtained from the accessed profile record, from the PDSN through the wireless network to the mobile station; and
providing packet data communication service through the wireless network, for the mobile station, via the PDSN and the home agent, using the downloaded static packet communication address and the packet communication address of the home agent.

7. The method of claim 6, wherein:
the static packet communication address comprises a statically assigned internet protocol (IP) address; and
the packet communication address of the home agent comprises an internet protocol (IP) address of the node of the wireless network that has been assigned to serve as the home agent for the mobile station.

8. The method of claim 7, further comprising:
assigning a different node of the wireless network that to serve as the home agent for the mobile station; and
modifying the profile record of the requesting subscriber to provide an internet protocol (IP) address of the different node as the packet communication address of the home agent.

9. The method of claim 7, wherein the sending steps and the downloading steps utilize messages transmissions of a mobile IP service protocol.

10. A programmed computer system having an interface for communication with elements of a network providing subscribers wireless packet data communication service and having access to a database of subscriber profile records, the computer system being programmed to perform the steps, comprising:
receiving a request for packet data communication service through the wireless network, from a mobile station of a requesting subscriber;
accessing a profile record for the requesting subscriber, in a database of wireless service subscribers;
responsive to the accessed profile record indicating that the requesting subscriber subscribes to a static address service, obtaining a static packet communication address of the requesting subscriber from the accessed profile record; and
downloading the static packet communication address obtained from the accessed profile record through the wireless network, for use by the mobile station for use in packet data communication through the wireless network.

11. The system of claim 10, wherein the static packet communication address comprises a statically assigned internet protocol (IP) address.

12. The system of claim 10, wherein the steps performed by the programmed computer system further comprise:
responsive to the accessed profile record indicating that the requesting subscriber subscribes to a static address service, obtaining a packet communication address of a node of the wireless network assigned to serve as a home agent for the requesting subscriber, from the accessed profile record; and
transmitting the packet communication address of the home agent obtained from the accessed profile record to a packet data serving node (PDSN) involved in establishment of the packet data communication service through the wireless network for the mobile station and to the mobile station.

13. The system of claim 12, wherein the packet communication address of the home agent comprises an internet protocol (IP) address of the home agent assigned to serve the requesting subscriber.

14. The system of claim 10, wherein the programmed computer system is an Authentication, Authorization and Accounting (AAA) server.

15. A software product comprising instructions executable by a computer, carried by at least one machine-readable medium, execution of the instructions by the computer causing the computer to perform a sequence of steps, comprising:
receiving a request for packet data communication service through a wireless network, from a mobile station of a requesting subscriber;

accessing a profile record for the requesting subscriber, in a database of wireless service subscribers;

responsive to the accessed profile record indicating that the requesting subscriber subscribes to a static address service, obtaining a static packet communication address of the requesting subscriber from the accessed profile record; and downloading the static packet communication address obtained from the accessed profile record through the wireless network, for use by the mobile station for use in packet data communication through the wireless network.

16. The software product of claim 15, wherein the static packet communication address comprises a statically assigned internet protocol (IP) address.

17. The software product of claim 15, wherein execution of the instructions further causes the computer to perform steps comprising:

responsive to the accessed profile record indicating that the requesting subscriber subscribes to a static address service, obtaining a packet communication address of a node of the wireless network assigned to serve as a home agent for the requesting subscriber, from the accessed profile record; and transmitting the packet communication address of the home agent obtained from the accessed profile record to a packet data serving node (PDSN) involved in establishment of the packet data communication service through the wireless network for the mobile station and to the mobile station.

18. The software product of claim 17, wherein the packet communication address of the home agent comprises an internet protocol (IP) address of the home agent assigned to serve the requesting subscriber.

19. The software product of claim 15, further comprising the database of wireless service subscribers.

20. The software product of claim 15, wherein the instructions comprise a program for performing Authentication, Authorization and Accounting (AAA) functions.

* * * * *